(12) United States Patent
Wang et al.

(10) Patent No.: US 12,420,273 B2
(45) Date of Patent: Sep. 23, 2025

(54) OZONE PURIFICATION CATALYST AND PREPARATION METHOD AND APPLICATION THEREOF

(71) Applicant: Sinocat Environmental Technology Co., Ltd., Chengdu (CN)

(72) Inventors: Yun Wang, Chengdu (CN); Qizhang Chen, Chengdu (CN); Yun Li, Chengdu (CN); Zhimin Liu, Chengdu (CN); Haidi Xu, Chengdu (CN); Jianli Wang, Chengdu (CN); Yaoqiang Chen, Chengdu (CN)

(73) Assignee: SINOTECH Company Limited, Chengdu (CN)

( * ) Notice: Subject to any disclaimer, the term of this patent is extended or adjusted under 35 U.S.C. 154(b) by 390 days.

(21) Appl. No.: 17/823,026

(22) Filed: Aug. 29, 2022

(65) Prior Publication Data

US 2022/0401940 A1 Dec. 22, 2022

Related U.S. Application Data

(63) Continuation of application No. PCT/CN2020/101368, filed on Jul. 10, 2020.

(30) Foreign Application Priority Data

Mar. 2, 2020 (CN) .......................... 202010136068.8

(51) Int. Cl.
| | | |
|---|---|---|
| *B01J 21/04* | (2006.01) | |
| *B01D 53/86* | (2006.01) | |
| *B01J 23/10* | (2006.01) | |
| *B01J 23/34* | (2006.01) | |
| *B01J 23/44* | (2006.01) | |
| *B01J 23/63* | (2006.01) | |
| *B01J 37/02* | (2006.01) | |

(52) U.S. Cl.
CPC ...... B01J 37/0205 (2013.01); B01D 53/8675 (2013.01); B01J 21/04 (2013.01); B01J 23/10 (2013.01); *B01D 2255/2063* (2013.01); *B01D 2255/2065* (2013.01); *B01D 2257/106* (2013.01)

(58) Field of Classification Search
CPC ... B01J 21/04; B01J 23/10; B01J 23/34; B01J 23/44; B01J 23/63; B01J 23/6562; B01J 37/0205; B01D 53/8675
USPC ....... 502/302–304, 324, 332, 334, 339, 355, 502/415
See application file for complete search history.

(56) References Cited

U.S. PATENT DOCUMENTS

| | | | | |
|---|---|---|---|---|
| 5,895,636 | A * | 4/1999 | Nguyen | B01D 53/8662 |
| | | | | 208/262.1 |
| 7,641,875 | B1 * | 1/2010 | Golden | C01B 13/32 |
| | | | | 502/313 |
| 7,888,278 | B2 * | 2/2011 | Rapier | B01J 23/63 |
| | | | | 501/153 |
| 9,239,064 | B2 * | 1/2016 | Helbig | F15B 1/022 |
| 9,358,533 | B2 * | 6/2016 | Tran | B01J 37/04 |
| 9,643,161 | B2 * | 5/2017 | Chiffey | B01J 23/42 |
| 9,707,545 | B2 * | 7/2017 | Felix | F01N 3/101 |
| 9,987,618 | B2 * | 6/2018 | Chiffey | F01N 3/2842 |
| 10,272,415 | B2 | 4/2019 | Li et al. | |
| 10,569,257 | B2 * | 2/2020 | Chiffey | F01N 3/2842 |
| 11,248,505 | B2 * | 2/2022 | Sung | B01J 23/02 |
| 11,794,169 | B2 * | 10/2023 | Chiffey | B01J 23/42 |

(Continued)

FOREIGN PATENT DOCUMENTS

| | | |
|---|---|---|
| CN | 103638917 A | 3/2014 |
| CN | 104056626 A | 9/2014 |

(Continued)

OTHER PUBLICATIONS

International Search Report dated Nov. 30, 2020 for International Patent Application No. PCT/CN2020/101368; 6 pgs.; China National Intellectual Property Administration (ISA/CN), Beijing, China.

*Primary Examiner* — Cam N. Nguyen

(74) *Attorney, Agent, or Firm* — Central California IP Group, P.C.; Andrew D. Fortney

(57) ABSTRACT

An ozone purification catalyst, and a preparation method therefor and an application thereof are provided. The catalyst coating uses macroporous, high specific surface and $CeO_2$ and/or $La_2O_3$ modified $Al_2O_3$ as the carrier material, and Mn and/or Pd as the active component. The preparation method is to prepare the $Al_2O_3$-based material by a sol-gel method, and then to load the active components on the carrier material, and to dry, calcinate and solidify to obtain the ozone purification catalyst. The catalysts as prepared shows a fast and efficient purification of ozone. The complete conversion temperature covers a wide range of temperature. The catalyst has excellent texture performance, high specific surface area and large pore volume, which is beneficial to ozone purification when the car is running at high speed. The particle sizes and colors of the catalyst can be modified according to various requirements. According to the actual application, it can be coated on the radiator fins of automobile water tanks, and any place where coating is allowed in public areas such as urban bus stations, stop signs, kiosks, roadside guardrails, or exterior walls of buildings that is in contact with outdoor air.

19 Claims, No Drawings

(56) References Cited

U.S. PATENT DOCUMENTS

| | | | |
|---|---|---|---|
| 2009/0208396 A1* | 8/2009 | Yang | B01J 35/19 423/247 |
| 2010/0227758 A1* | 9/2010 | Yang | B01J 37/08 502/303 |
| 2015/0266004 A1* | 9/2015 | Kumatani | B01J 35/635 502/439 |
| 2017/0216820 A1 | 8/2017 | Li et al. | |

FOREIGN PATENT DOCUMENTS

| | | |
|---|---|---|
| CN | 108069496 A | 5/2018 |
| CN | 108069499 A | 5/2018 |
| CN | 108114711 A | 6/2018 |
| CN | 108212153 A | 6/2018 |
| JP | H07102957 A | 4/1995 |

* cited by examiner

OZONE PURIFICATION CATALYST AND PREPARATION METHOD AND APPLICATION THEREOF

RELATED APPLICATIONS

The present application is a continuation of International Appl. No. PCT/CN2020/101368, filed Jul. 10, 2020, expired, which claims priority to Chinese Pat. Appl. No. 202010136068.8, filed Mar. 2, 2020, both of which are incorporated herein by reference in their entireties.

FIELD OF THE DISCLOSURE

The invention belongs to the technical field of catalyst research, in particular to the technical field of ozone ($O_3$) purification catalyst research, including catalytic technology application and environmental protection technology related to air pollution control, and particularly relates to an ozone purification catalyst and its preparation method and application.

BACKGROUND

Ozone ($O_3$) in the near-ground atmospheric environment is mainly a secondary pollutant produced by volatile organic compounds and nitrogen oxides under light. According to the "2018 State of The Ecological Environment in China" issued by the Ministry of Ecology of the People's Republic of China, in 2018, in the National 338 cities of prefecture-level and above, ozone had an average concentration of 151 $g/m^3$, increased for three consecutive years compared with 149 $g/m^3$ in 2017 and 138 $g/m^3$ in 2016. ozone is the only pollutant whose average concentration in the air has increased in 2018 compared with 2017 among the six pollutants monitored ($PM_{2.5}$, $PM_{10}$, $O_3$, $SO_2$, $NO_2$ and CO). In 2018, in 338 cities of prefecture-level and above across the country, the number of days when ozone was the primary pollutant accounted for 43.5% of the total number of days exceeding the standard, and the number of days when $PM_{2.5}$ was the primary pollutant accounted for 44.1% of the total number of days exceeding the standard. ozone and $PM_{2.5}$ were the two main pollutants of urbair pollution. In 2018, in the Beijing-Tianjin-Hebei region and surrounding areas, the number of days with ozone as the primary pollutant accounted for 46.0% of the total number of days exceeding the standard, which exceeded 40.7% of $PM_{2.5}$ and became the primary pollutant. For the above reasons, similar to the $PM_{2.5}$ which is currently focused on governance, ozone in the air needs to be focused on governance as well.

The treatment methods of ozone in the air mainly include activated carbon adsorption method, chemical liquid absorption method, thermal decomposition method, dilution method and catalytic decomposition method. Each method has its advantages, disadvantages and application scenarios. Among them, the activated carbon adsorption method, the chemical liquid absorption method, the thermal decomposition method and the dilution method have the limitations of high energy consumption, secondary pollutants or small processing volume, etc., which are applicable for local and small-scale ozone purification. The catalytic decomposition method has the characteristics of high efficiency and stable performance. It is an ideal method for purifying ozone in the air in a large scale, and it is also one of the most feasible methods for purifying ozone in the air. The active components of the ozone purification catalyst mainly include transition metals and noble metals.

If ozonolysis catalysts are to be applied in large scales in the industry, the key issues that need to be solved are as follows.

1. Improve the moisture resistance of the catalyst. The traditional Mn-based ozone decomposition catalyst has lower purification efficiency in high-humidity air, and with prolonged exposure time, the activity will be gradually reduced.

2. Improve catalyst activity under high space velocity. For the ozone decomposing catalyst, an important application is to be coated on the water tank of car, in order to purify ozone generated from the automobile exhaust and ozone in the air. The conventional Mn-based catalyst has relatively small specific surface area and pore volume, resulting in a short contact time between the catalyst and ozone and a low reaction efficiency when the car is running at high speed. Therefore, it is necessary to improve the texture performance of the catalyst to promote the ozone purification efficiency under high space velocity conditions when the car is running at high speed.

3. Improve the stability of the catalyst. For the ozone purification catalyst coated on the car, taking the private cars as an example, most of them have to run 200,000 kilometers or more than 10 years. In order for the catalyst to have high purification efficiency throughout the life cycle of the car, the stability and durability of the catalyst must be improved.

4. Improve the activity of the catalyst at room temperature. For the ozone decomposition catalysts coated on the outer surface of buildings, they must have a high purification efficiency at room temperature. Therefore, it is necessary to reduce the complete conversion temperature of ozone decomposition to room temperature to achieve a high purification efficiency in the majority of areas in most seasons.

BRIEF SUMMARY OF THE INVENTION

The purpose of the present invention is to provide a catalyst for purifying ozone ($O_3$) in the air. The catalyst prepared by the invention can realize the rapid and efficient purification of O3 under the conditions of high humidity, high space velocity and certain temperature. The series of catalysts prepared by the invention varies in performance, particle size and color, and can be coated on the radiator fins of automobile water tanks, and any place where coating is allowed in public areas such as urban bus stations, stop signs, kiosks, roadside guardrails, or exterior walls of buildings that is in contact with outdoor air.

The catalyst coating of the present invention mainly uses macroporous, high specific surface and modified $Al_2O_3$ as the carrier material, and noble metal, transition metal or a mixture of noble metal and transition metal as the active component, and the main active component is Mn and/or Pd. The carrier material is $Al_2O_3$ modified by $CeO_2$ and/or $La_2O_3$. The preparation method adopted for the catalyst of the present invention is to first prepare the $Al_2O_3$-based material by a sol-gel method, and then to load the active components on the carrier material, and to dry, calcinate and solidify to obtain the $O_3$ purification catalyst.

The present invention prepares a series of $O_3$ purification catalysts suitable for application under high space velocity, high humidity and certain temperature conditions. The catalyst has a wide use temperature range, high purification efficiency and many application scenarios.

The main content of the present invention is as follows.

A preparation method of an ozone purification catalyst comprises the following steps:

(1) Preparing $CeO_2$ and/or $La_2O_3$ modified $Al_2O_3$ carrier by a sol-gel method: mixing a soluble Ce salt solution or/and a soluble La salt solution with pseudo-boehmite, and adjusting the pH by acid to 3.5 to 4.5, wherein the $CeO_2$ content accounts for 0 to 30 wt % of the carrier, the $La_2O_3$ content accounts for 0 to 5 wt % of the carrier, and the $Al_2O_3$ content accounts for 65 to 100 wt % of the carrier; then calcinating at 500 to 600° C. in air atmosphere for 2 to 5 hours, and then at 800° C. in air atmosphere for 2 to 5 hours to obtain the modified carrier;

(2) Loading a soluble Pd salt solution and/or a soluble Mn salt solution on the modified carrier obtained in the Step (1) by an equal-volume impregnation method: wherein the Pd content, based on the element, accounts for 0 to 0.5 wt % of the total weight of the catalyst; the Mn content, based on the element, accounts for 0 to 20 wt % of the total weight of the catalyst; then, drying at 60 to 120° C. for 2 to 6 hours, and then calcining at 400 to 550° C. in air atmosphere for 2 to 7 hours to obtain the catalyst.

In the step (1), the soluble Ce salt solution includes but is not limited to $Ce(NO_3)_3$ solution, and the soluble La salt solution includes but is not limited to $La(NO_3)_3$ solution.

The acid for adjusting the pH in the step (1) includes, but is not limited to, nitric acid.

In the step (2), the soluble Pd salt solution includes but is not limited to $Pd(NO_3)_2$, and the soluble Mn salt solution includes but is not limited to $Mn(CH_3COO)_2$.

The ozone purification catalyst prepared by the invention is applied to the preparation of a catalyst for purifying ozone in the air.

The features of the present invention are as follows.

(1) The present invention provides a series of ozone purification catalysts with complete conversion temperature covering a wide range of temperature (22 to 52° C.), with different colors and different particle sizes. The catalyst has excellent texture performance, high specific surface area and large pore volume, which is beneficial to $O_3$ purification when the car is running at high speed.

(2) The present invention provides a series of ozone catalysts, which can be coated on the radiator fins of automobile water tanks, and any place where coating is allowed in public areas such as urban bus stations, stop signs, kiosks, roadside guardrails, or exterior walls of buildings that is in contact with outdoor air.

(3) The present invention adopts the conventional sol-gel method and equal volume impregnation process, and the process is simple, stable and feasible.

(4) The catalyst of the present invention has high moisture resistance, resistance to high space velocity and high stability, and is suitable for the application under different temperature conditions, such that the $O_3$ in the air can be efficiently purify, which shows great significant to the reduction of $O_3$ and has wide application prospect.

DETAILED DESCRIPTION OF THE DISCLOSURE

The present invention will be further described below in conjunction with specific embodiments. The specific embodiments are further explanations of the principles of the present invention and do not limit the present invention in any way. The same or similar technologies as the present invention do not exceed the protection scope of the present invention.

Example 1

(1) A dilute $HNO_3$ solution was added to pseudo-boehmite, and the pH was adjusted to 3.5 to 4.5, to prepare $Al_2O_3$ by the sol-gel method. The $Al_2O_3$ prepared by the sol-gel method was calcined at 550° C. in air atmosphere for 3 hours, and then continued to be calcined at 800° C. for 3 hours to improve the stability and durability of the catalyst. M1 was obtained. The material color was white. The particle size was 3 to 15 μm. The specific surface area was 160 $m^2/g$. The pore volume was 0.38 ml/g.

(2) A $Mn(CH_3COO)_2$ solution was loaded onto M1 by an equal volume impregnation method. The Mn content, based on the element, accounted for 12% of the catalyst mass. Then, it was dried at 60 to 120° C. for 5 hours and calcined at 450° C. in air atmosphere for 5 hours to obtain catalyst C1. The color of the catalyst was black.

Example 2

(1) A dilute $HNO_3$ solution and a $La(NO_3)_3$ solution were added to pseudo-boehmite, and the pH was adjusted to 3.5 to 4.5, to prepare $La_2O_3$—$Al_2O_3$ by the sol-gel method, wherein the $La_2O_3$ accounted for 3% of the mass of $La_2O_3$—$Al_2O_3$. The $La_2O_3$—$Al_2O_3$ prepared by the sol-gel method was calcined at 600° C. in air atmosphere for 5 hours, and then continued to be calcined at 800° C. for 3 hours to improve the stability and durability of the catalyst. M2 was obtained. The material color was white. The particle size was 3 to 15 μm. The specific surface area was 178 $m^2/g$. The pore volume was 0.43 ml/g.

(2) A $Mn(CH_3COO)_2$ solution was loaded onto M2 by an equal volume impregnation method. The Mn content, based on the element, accounted for 12% of the catalyst mass. Then, it was dried at 60 to 120° C. for 2 to 6 hours and calcined at 500° C. in air atmosphere for 5 hours to obtain catalyst C2. The color of the catalyst was black.

Example 3

(1) A dilute $HNO_3$ solution, a $La(NO_3)_3$ solution and a $Ce(NO_3)_3$ solution were added to pseudo-boehmite, and the pH was adjusted to 3.5 to 4.5, to prepare $La_2O_3$-$Ce_2O_3$—$Al_2O_3$ by the sol-gel method, wherein the $La_2O_3$ accounted for 3% of the mass of $La_2O_3$-$Ce_2O_3$—$Al_2O_3$, and the $Ce_2O_3$ accounted for 10% of the mass of $La_2O_3$-$Ce_2O_3$—$Al_2O_3$. The $La_2O_3$-$Ce_2O_3$—$Al_2O_3$ prepared by the sol-gel method was calcined at 500° C. in air atmosphere for 5 hours, and then continued to be calcined at 800° C. for 3 hours to improve the stability and durability of the catalyst. M3 was obtained. The material color was light yellow. The particle size was 3 to 15 μm. The specific surface area was 152 $m^2/g$. The pore volume was 0.37 ml/g.

(2) A $Mn(CH_3COO)_2$ solution was loaded onto M3 by an equal volume impregnation method. The Mn content, based on the element, accounted for 12% of the catalyst mass. Then, it was dried at 60 to 120° C. for 5 hours and calcined at 450° C. in air atmosphere for 3 hours to obtain catalyst C3. The color of the catalyst was black.

Example 4

(1) A dilute $HNO_3$ solution, a $La(NO_3)_3$ solution and a $Ce(NO_3)_3$ solution were added to pseudo-boehmite, and the pH was adjusted to 3.5 to 4.5, to prepare $La_2O_3$-$Ce_2O_3$—$Al_2O_3$ by the sol-gel method, wherein the $La_2O_3$ accounted for 2% of the mass of $La_2O_3$-$Ce_2O_3$—$Al_2O_3$, and the $Ce_2O_3$ accounted for 15% of the mass of $La_2O_3$-$Ce_2O_3$—$Al_2O_3$. The $La_2O_3$-$Ce_2O_3$—$Al_2O_3$ prepared by the sol-gel method was calcined at 500° C. in air atmosphere for 5 hours, and then continued to be calcined at 800° C. for 3 hours to improve the stability and durability of the catalyst. M4 was obtained. The material color was light yellow. The particle size was 3 to 15 μm. The specific surface area was 152 m²/g. The pore volume was 0.36 ml/g.

(2) A $Mn(CH_3COO)_2$ solution and a $Pd(NO_3)_2$ were loaded onto M4 by an equal volume impregnation method. The Mn content, based on the element, accounted for 8% of the catalyst mass. The Pd content, based on the element, accounted for 0.3% of the catalyst mass. Then, it was dried at 60 to 120° C. for 5 hours and calcined at 500° C. in air atmosphere for 5 hours to obtain catalyst C4. The color of the catalyst was black.

Example 5

(1) A dilute $HNO_3$ solution and a $La(NO_3)_3$ solution were added to pseudo-boehmite, and the pH was adjusted to 3.5 to 4.5, to prepare $La_2O_3$—$Al_2O_3$ by the sol-gel method, wherein the $La_2O_3$ accounted for 4% of the mass of $La_2O_3$—$Al_2O_3$. The $La_2O_3$—$Al_2O_3$ prepared by the sol-gel method was calcined at 600° C. in air atmosphere for 5 hours, and then continued to be calcined at 800° C. for 3 hours to improve the stability and durability of the catalyst. M5 was obtained. The material color was white. The particle size was 3 to 15 μm. The specific surface area was 172 m²/g. The pore volume was 0.43 ml/g.

(2) A $Pd(NO_3)_2$ was loaded onto M5 by an equal volume impregnation method. The Pd content, based on the element, accounted for 0.5% of the catalyst mass. Then, it was dried at 60 to 120° C. for 2 to 6 hours and calcined at 500° C. in air atmosphere for 5 hours to obtain catalyst C5. The color of the catalyst was light brown.

Example 6

(1) A dilute $HNO_3$ solution, a $La(NO_3)_3$ solution and a $Ce(NO_3)_3$ solution were added to pseudo-boehmite, and the pH was adjusted to 3.5 to 4.5, to prepare $La_2O_3$-$Ce_2O_3$—$Al_2O_3$ by the sol-gel method, wherein the $La_2O_3$ accounted for 3% of the mass of $La_2O_3$-$Ce_2O_3$—$Al_2O_3$, and the $Ce_2O_3$ accounted for 20% of the mass of $La_2O_3$-$Ce_2O_3$—$Al_2O_3$. The $La_2O_3$-$Ce_2O_3$—$Al_2O_3$ prepared by the sol-gel method was calcined at 500° C. in air atmosphere for 5 hours, and then continued to be calcined at 800° C. for 3 hours to improve the stability and durability of the catalyst. M6 was obtained. The material color was light yellow. The particle size was 3 to 15 μm. The specific surface area was 132 m²/g. The pore volume was 0.35 ml/g.

(2) A $Pd(NO_3)_2$ was loaded onto M6 by an equal volume impregnation method. The Pd content, based on the element, accounted for 0.5% of the catalyst mass. Then, it was dried at 60 to 120° C. for 5 hours and calcined at 500° C. in air atmosphere for 5 hours to obtain catalyst C6. The color of the catalyst was yellowish brown.

Evaluation Test

The catalysts prepared in the above examples were subjected to an activity evaluation test. In order to evaluate the activity of the catalyst, the prepared catalyst was coated on the metal honeycomb substrate. The catalyst coated on the metal honeycomb substrate was tested for the activity of each catalyst under the following test conditions.

Simulated atmosphere: $O_3$ concentration of $(5.8\pm0.2)\times10^{-7}$ (volume fraction), air as balance gas, relative humidity of 70 to 90%, SV=500,000 $h^{-1}$.

The catalyst was programmed to be heated to 120° C. under the simulated atmosphere, kept at a constant temperature for 2 hours, and then cooled to room temperature.

During the cooling process, an $O_3$ analyzer was used to test the $O_3$ content at the downstream of the catalyst. The formula for calculating the conversion efficiency of $O_3$ at a certain temperature is: (the initial $O_3$ concentration minus the unconverted $O_3$ concentration in the exhaust)/the initial ozone concentration. The temperature at which the conversion efficiency reaches 90% is called the complete conversion temperature and is denoted as $T_{90}$.

Table 1 compares the complete $O_3$ conversion temperature $T_{90}$ of the catalyst prepared in the example.

| Catalyst | $T_{90}$ (° C.) |
| --- | --- |
| Example 1 | 49 |
| Example 2 | 52 |
| Example 3 | 43 |
| Example 4 | 22 |
| Example 5 | 26 |
| Example 6 | 23 |

It can be seen from Table 1 that

1) Comparing Examples C1 and C2, wherein the active component $MnO_x$ was loaded on M1 and M2, respectively, under the test conditions of the present invention, although the $T_{90}$ of M2 was 3° C. higher than that of M1, M2 has a larger specific surface, larger pore volume and higher temperature tolerance, such that the relative stability of the catalyst was higher, which is suitable for scenarios with higher requirements on the service life of the catalyst.

2) Comparing Examples C2 and C3, after adding a certain amount of $Ce_{02}$ to $La_2O_3$—$Al_2O_3$, the prepared catalyst has a significant increase in $O_3$ activity, and $T_{90}$ is reduced by 9° C.

3) Comparing Examples C3 and C4, after the single active component $MnO_x$ is changed to the dual active component $MnO_x$ and PdO, the prepared catalyst has a significant increase in activity to $O_3$, and the $T_{90}$ is reduced to 22° C. At room temperature, $O_3$ can be completely converted.

4) Examples C2, C3, C5 and C6 are compared, wherein the two groups of C2 and C5, C3 and C6, respectively, have the same catalytic materials and different active components, which are $MnO_x$ and PdO respectively. Comparing the activity of the four catalysts to $O_3$, the results all show that when PdO is used as the active component, the activity is significantly better than that with $MnO_x$ as the active component. Due to the high price of noble metals, catalysts with noble metals as active components are mainly suitable for scenarios where the application temperature is low and the purification efficiency and rate are high.

5) Examples C4, C5, C6 are compared, wherein C4 has a dual active component, and C5 and C6 have a single noble metal active component. By using dual active components, on the basis of a slight increase in activity ($T_{90}$ decreased by 1° C. and 4° C., respectively), the amount of noble metals also decreased (from 0.5% to 0.3%).

The above results show that the C1, C2 and C3 catalysts are relatively inexpensive, the $T_{90}$ of 03 is higher than room temperature, the purification temperature is within the temperature range of the radiator fin of the water tank when the car is running, and the particle size of the catalyst is 3 to 15 m, with moderate particle size. After coating, the firmness is high, and it can be coated on the radiator of the car radiator or used in application scenarios that do not require high purification efficiency and speed. For C4, C5 and C6 catalysts, the catalyst price is slightly higher, $T_{90}$ of $O_3$ is closed to the ambient temperature in most areas in Southern China. In addition, the $T_{90}$ of the catalyst can be adjusted by increasing the amount of active components to be suitable for lower ambient temperature. It can be applied to any place where coating is allowed in public areas such as urban bus stations, stop signs, kiosks, roadside guardrails, or exterior walls of buildings that is in contact with outdoor air.

What is claimed:

1. A method of preparing an ozone purification catalyst, comprising the following steps:
preparing a $CeO_2$ and $La_2O_3$ modified $Al_2O_3$ carrier by a sol-gel method: mixing a soluble Ce salt solution and a soluble La salt solution with pseudo-boehmite, adjusting the pH with an acid to 3.5 to 4.5, wherein the $CeO_2$ has a content of 15 to 20 wt % in the carrier, the $La_2O_3$ has a content of 2 to 3 wt % in the carrier, and the $Al_2O_3$ has a content of 77 to 83 wt % in the carrier; then calcining at 500 to 600° C. in air for 2 to 5 hours, and then at 800° C. in air for 2 to 5 hours to obtain the modified $Al_2O_3$ carrier;
loading a soluble Pd salt solution and/or a soluble Mn salt solution on the modified $Al_2O_3$ carrier by an equal-volume impregnation method: wherein the Pd salt solution provides a Pd content, based on the element, of 0.3 to 0.5 wt % of the total weight of the ozone purification catalyst; the Mn salt solution provides a Mn content, based on the element, of 0 to 8 wt % of the total weight of the ozone purification catalyst; then, drying at 60 to 120° C. for 2 to 6 hours, and then calcining at 400 to 550° C. in air for 2 to 7 hours to obtain the ozone purification catalyst.

2. The method according to claim 1, wherein the soluble Ce salt solution includes $Ce(NO_3)_3$ solution, and the soluble La salt solution includes $La(NO_3)_3$ solution.

3. The method according to claim 1, wherein the acid for adjusting the pH includes nitric acid.

4. The method according to claim 1, wherein the soluble Pd salt solution includes $Pd(NO_3)_2$, and the soluble Mn salt solution includes $Mn(CH_3COO)_2$.

5. The method according to claim 1, wherein the Mn content is 8 wt % of the total weight of the ozone purification catalyst.

6. The method according to claim 5, wherein the soluble Mn salt solution includes $Mn(CH_3COO)_2$.

7. The method according to claim 1, wherein the Pd content is 0.5 wt % of the total weight of the ozone purification catalyst, and the Mn content is 0 wt % of the total weight of the ozone purification catalyst.

8. The method according to claim 7, wherein the soluble Pd salt solution includes $Pd(NO_3)_2$.

9. The method according to claim 1, wherein calcining at 500 to 600° C. in air for 2 to 5 hours comprises calcining at 500° C. in air for 5 hours.

10. The method according to claim 9, wherein calcining at 800° C. in air atmosphere for 2 to 5 hours comprises calcining at 800° C. in air for 3 hours.

11. The method according to claim 1, wherein drying at 60 to 120° C. for 2 to 6 hours comprises drying at 60 to 120° C. for 5 hours.

12. The method according to claim 11, wherein calcining at 400 to 550° C. in air for 2 to 7 hours comprises calcining at 500° C. in air for 5 hours.

13. The method according to claim 1, wherein calcining at 400 to 550° C. in air for 2 to 7 hours comprises calcining at 500° C. in air for 5 hours.

14. The method according to claim 1, wherein the modified $Al_2O_3$ carrier has a particle size of 3 to 15 μm.

15. The method according to claim 14, wherein the modified $Al_2O_3$ carrier has a specific surface area of 132-152 $m^2/g$.

16. The method according to claim 15, wherein the modified $Al_2O_3$ carrier has a pore volume of 0.35-0.36 ml/g.

17. The method according to claim 14, wherein the modified $Al_2O_3$ carrier has a pore volume of 0.35-0.36 ml/g.

18. The method according to claim 1, wherein the modified $Al_2O^3$ carrier has a specific surface area of 132-152 $m^2/g$.

19. The method according to claim 1, wherein the modified $Al_2O3$ carrier has a pore volume of 0.35-0.36 ml/g.

* * * * *